United States Patent [19]
Brabon

[11] 4,448,113
[45] May 15, 1984

[54] COFFEE REFRESHENER
[76] Inventor: David L. Brabon, 401 Kenyon Ave., Wilmore, Ky. 40390
[21] Appl. No.: 428,006
[22] Filed: Sep. 29, 1982
[51] Int. Cl.³ .............................................. A47J 31/00
[52] U.S. Cl. ...................................... 99/290; 99/304; 219/296; 219/297; 219/314
[58] Field of Search ................ 99/279, 280, 281, 282, 99/283, 290, 291, 294, 295, 300, 304, 305, 307, 308, 316; 219/296, 297, 314

[56] References Cited
U.S. PATENT DOCUMENTS

| | | | |
|---|---|---|---|
| 2,926,234 | 2/1960 | Palmer | 219/44 |
| 3,608,471 | 9/1971 | Martin | 99/291 |
| 3,835,295 | 9/1974 | Ronchese | 219/314 |
| 3,878,360 | 4/1975 | Augustine et al. | 219/312 |
| 4,039,771 | 8/1977 | Thorsoe et al. | 219/328 |
| 4,147,097 | 4/1979 | Gregg | 99/283 |
| 4,287,817 | 9/1981 | Moskowitz et al. | 99/282 |

*Primary Examiner*—Robert W. Jenkins
*Assistant Examiner*—Arthur D. Dahlberg
*Attorney, Agent, or Firm*—Basile, Weintraub and Hanlon

[57] ABSTRACT

An apparatus is disclosed for making a drip-type coffee beverage wherein the apparatus has a separate flow path for receiving and reheating a previously filtered coffee brew.

5 Claims, 6 Drawing Figures

COFFEE REFRESHENER

BACKGROUND OF THE INVENTION

I. Field of the Invention

The present invention relates to improvements in the well-known "drip" or filter coffee making apparatuses and, in particular, to a coffee maker having a separate flow path for reheating coffee.

II. Description of the Prior Art and Prior Art Statement

In the past a wide variety of different types of coffee making apparatuses has been developed and used, the most common form of which is the type wherein the coffee beverage is prepared by contacting ground and roasted coffee beans constrained into a brewing basket with water at a temperature slightly below the boiling point of water. The trend toward the use of mixes which make it easy to prepare instantly beverages which formerly required cooking and brewing has resulted in a demand for appliances which boil water quickly and easily. Some of the first and least expensive appliances of this type involve emersion heaters which are merely inserted into a cup or small vessel to heat the contents. Such appliances are hazardous in that if they are not used with considerable care, there is a danger of receiving an electric shock or of burning oneself in handling the exposed heating element. Other more sophisticated appliances for heating and boiling liquids consist of electrified teakettles which are nothing more than teakettles with built-in electrical heating elements. While such appliances could quickly heat quantities of liquid more sufficiently and more rapidly than similar vessels used in connection with burner or heating elements of the stove, they generally were expensive and unappealing to the user, since they offer very little advantage over the use of the stove.

A variety of improved apparatuses for making drip-type coffee has been disclosed in the prior art which overcomes many of the aforementioned difficulties. Examples of such prior art apparatuses are disclosed in U.S. Pat. Nos. 2,926,234; 3,878,360; 3,835,295; 4,039,771; 4,147,097 and 4,287,817. Each of these patents are relevant to the present invention in that they illustrate apparatuses for heating water in preparation for brewing coffee. Certain of these apparatuses disclose a provision for merely heating hot water and delivering the hot water independent of the brewing system. None of the aforementioned prior art, however, provide a simple and efficient means for reheating a single cup of coffee which the user has permitted to cool. None of the aforementioned prior art discloses an apparatus which reheats a cup of coffee through a conduit which is separate from the main fluid carrying conduit.

The aforementioned prior art in the opinion of applicant and applicant's attorney represents the most relevant art of which applicant and his attorney are aware.

SUMMARY OF THE INVENTION

The present invention, which will be described subsequently in greater detail, comprises a drip coffee maker having a drip brew basket filter for receiving a bed of roasted and ground coffee and means for providing a predetermined quantity of heated water for drip extracting the roast and ground coffee when heated water passes through the bed of ground coffee. The coffee making further comprises a heating element for providing the heated water and a separate liquid carrying conduit through which previously brewed coffee may be passed for the purpose of reheating the previously brewed coffee and an externally mounted valve to permit the reheated coffee to be separately retrieved.

It is therefore a primary object of the present invention to provide a drip coffee maker having a separate flow path through its heating element to reheat previously brewed coffee and a separate valve means for pouring the reheated coffee from the apparatus.

Other objects, advantages and applications of the present invention will become apparent to those skilled in the art of drip coffee makers when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like components throughout the several views, and wherein.

DESCRIPTION OF THE PREFERRED EMBODIMENT

Figure 1:
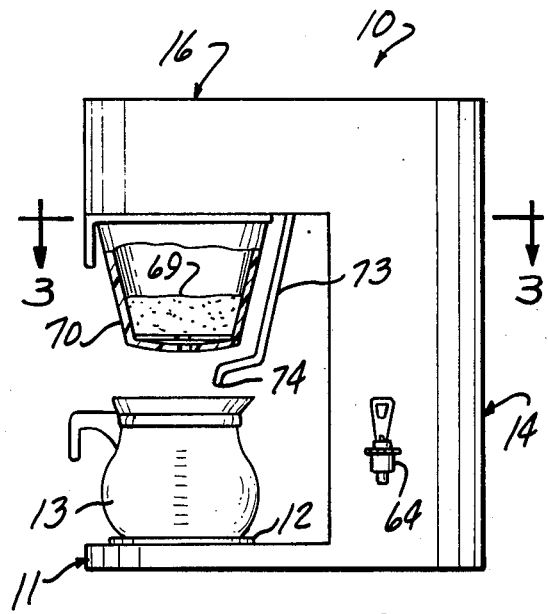
FIG. 1 is a right-side elevational view of a cold water pour-in coffee maker constructed in accordance with the principles of the present invention.
Figure 2:
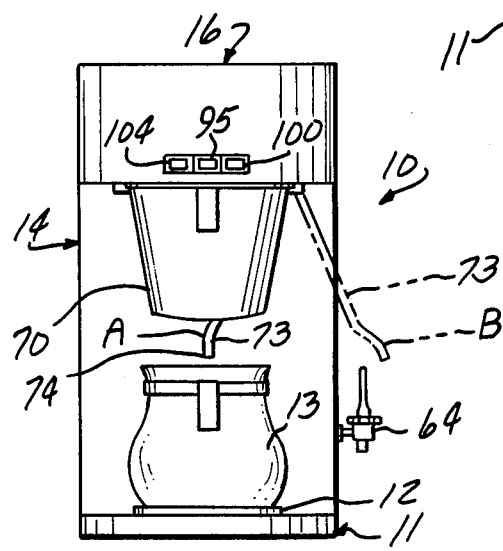
FIG. 2 is a front elevational view of the coffee maker illustrated in FIG. 1.
Figure 3:
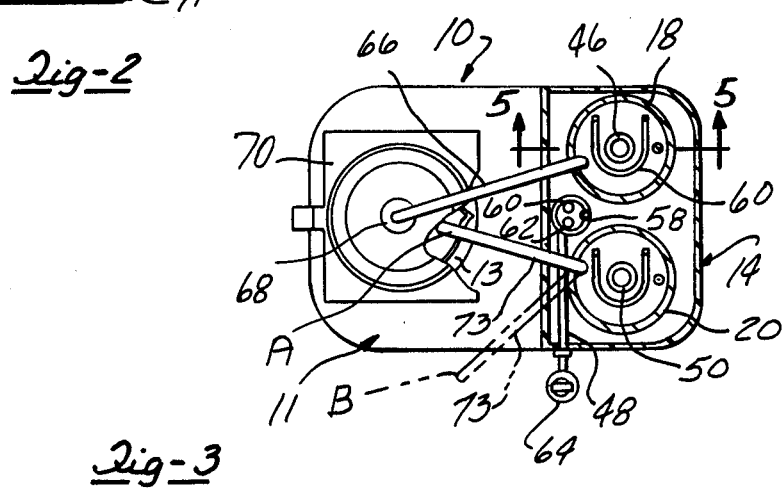
FIG. 3 is a cross-sectional view of the coffee maker taken along line 3—3 of FIG. 1.
Figure 4:
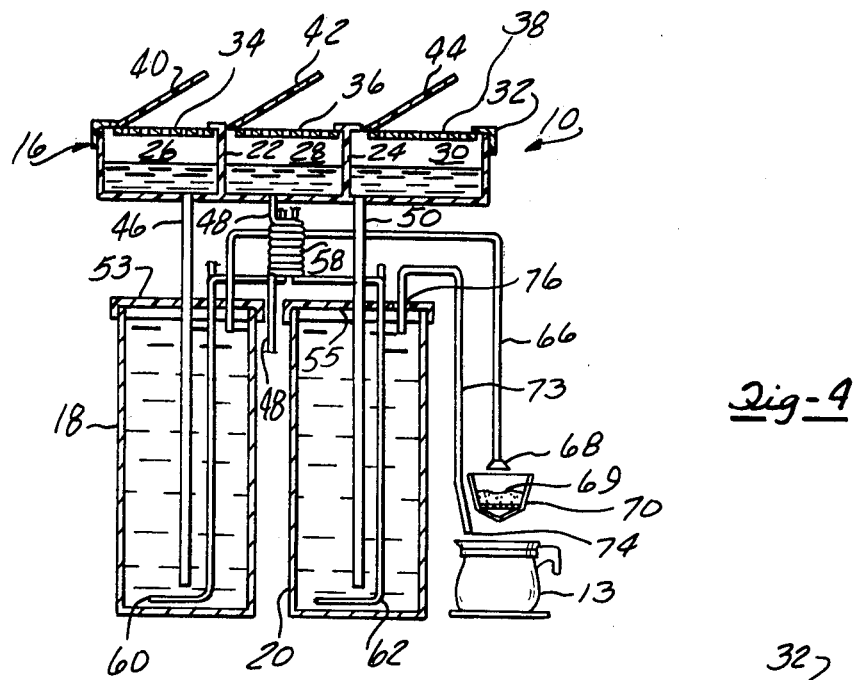
FIG. 4 is a pictorial schematic diagram of the coffee maker illustrated in FIG. 1.

Referring now to the drawings and, in particular, FIGS. 1 through 4 wherein there is illustrated one example of the present invention in the form of a coffee maker 10. The coffee maker 10 comprises a base 11 which carries an electrical coffee warmer 12 on which a conventional coffee pot 13 is positioned. The base 11 is further provided with an upstanding housing 14 and an upper housing 16 which overlays the base 11. As can be seen in FIGS. 3 and 4, the upstanding housing 14 encloses a pair of cylindrical water tanks 18 and 20 which are identical except as described hereinafter.

The upper housing 16 is divided by means of partitions 22 and 24 (FIG. 3) into three separate reservoirs 26, 28 and 30. The reservoirs are enclosed by a top wall 32 that is secured to the outer edges of the upper housing 16. The top wall 32 is provided with three grills 34, 36 and 38 which, respectively, communicate with the reservoirs 26, 28 and 30 and through which a predetermined quantity of cold water may be poured from a beaker when the associated hinged cover 40, 42, 44 is shifted from a closed position to the open position illustrated in FIG. 4. Each of the reservoir 26, 28 and 30, respectively, has an outlet tube 46, 48 and 50 associated therewith. As can best be seen in FIG. 5, each outlet tube has a threaded upper end that extends through the bottom 51 of its associated reservoir and is secured thereto by a hollow nut 52. The tubes 46 and 50 extend downwardly from their respective reservoirs 26, 30 and into the water tanks 18 and 20, respectively, and terminate at a distance above the bottom wall of their respective tanks. The tubes 46 and 50 pass through the upper walls 53 and 55 of their associated tanks 18 and 20, and a suitable seal (not shown) is provided to prevent the passage of water through the juncture. As can also be seen in FIG. 5, the top wall 53, 55 of each tank 18 and 20 has a vent tube 54 that passes through an upstanding sleeve 56 and its associated reservoir so as to place the vent tube 54 and therefore its associated water tank 18, 20 in direct communication with the atmosphere so that atmospheric pressure is available to cause a siphoning effect, as explained hereinafter. The tube 48 associated with the reservoir 38 communicates with a heat exchanger 58 which will also be described hereinafter in greater detail.

In order to heat the water that is stored in the water tanks 18 and 20 to the desired temperatures for their extraction purposes, which will be described hereinafter, electric tank heaters 60 and 62 of the emersion type are suitably mounted within the water tanks 18 and 20 respectively.

As can best been seen in FIGS. 3 and 4, the tube 48 associated with the reservoir 28 is coiled about a leg of each of the heaters 60 and 62. The coil is of sufficient length that any water passing therethrough when the heaters 60 and 62 are activated will be raised to nearly the boiling point of water. The tube 48 then exists externally of the coffee maker 10 through an on-off valve 64 mounted on the right side of the housing 14.

The water tank 18 has a discharge line or conduit 66 which opens at one end into the upper end of water tank 18 through its associated cover 53, and its other end terminates in a spray nozzle 68 where it overlays a ground coffee bed 69 that is positioned in a drip brew basket 70 which, in turn, may be provided with a filter positioned on the bottom of the basket 70.

In a similar manner the water tank 20 is provided with an outlet tube 73, one end of which opens at the upper end of the water tank 20 and extends through the cover 55 associated with the water tank 20 and exits from the coffee maker through the bottom wall of the upper housing 16 extending downwardly, bypassing the drip brew basket 70 where it terminates in a nozzle 74. The outlet tube 73 extends through a sealed bearing 76 located in the housing cover 55 of the water tank 20 so as to permit the rotational movement of the tube 73 from the position illustrated in FIGS. 2 and 3 at A to the position illustrated in phantom lines at B.

In order to utilize the coffee maker 10 to perk coffee, the drip brew basket 70 is filled with an appropriate amount of ground coffee 69. Assuming the water tank 18 has been previously filled and heated by the heaters 60, a predetermined quantity of cold water is poured into the reservoir 26 through the grill 34. The cold water will flow through the inlet tube 46 into the lower end of the tank 18. When this cold water flows into the bottom end of the tank 18, warm water disposed at the upper end of the tank 18 is displaced and siphoned through the line 66 where it is communicated to the ground coffee 69 via the spray nozzle 68. The amount of warm extraction water that is siphoned out from tank 18 depends upon the amount of cold water that is poured into the reservoir 26, and normally this amount will be equal to the amount that can be held by the coffee pot 13. Of course, the siphoning action is stopped when the level of water within the tank 18 drops below the bottom end of the outlet line 66 within the tank 18.

When it is desired to have hot water for uses other than brewing coffee, an appropriate amount of cold water may be poured into the reservoir 30 through the grill 38, such water being communicated to the tank 20 via the inlet tube 50 wherein the cold water flowing into the bottom end of the tank 20 will cause the warm water disposed at the upper end of the tank 20 to be displaced and siphoned through the outlet tube 73 and exhausted through the nozzle 74 into an awaiting empty container. When the warmer 12 is occupied by a pot of warm coffee, the nozzle 74 may be rotated from the position A to the position B, and a separate container may be filled with a desired amount of water. When the warmer 12 is vacant, then a container may be left on the warmer 12 and the nozzle 74 is left in the position A illustrated in FIG. 3.

When it is desired to reheat a previously brewed, but now cold, cup of coffee, the cold coffee is poured through the grid 36 into the reservoir 28 while the electric heaters 60 and 62 are turned on such that the previously brewed coffee flowing through the heat exchanger 58 will be raised to near the boiling point end then exhausted from the coffee maker 10 via nozzle 64 when the on-off lever is actuated to the on position. This very simple means permits the user of the coffee maker 10 to reheat cold coffee instead of wasting the same, and heating of the coffee is accomplished by the heaters 60 and 62 that are already integral with the system and are normally in an on position providing heat for the water tanks 18 and 20. As will be described hereinafter, appropriate thermostats associated with the water tanks 18 and 20 may cause the heaters 60 and 62 to be automatically turned off; however, appropriate switching as described hereinafter will insure the user of being able to obtain the necessary heat to reheat previously brewed coffee.

Figure 5:
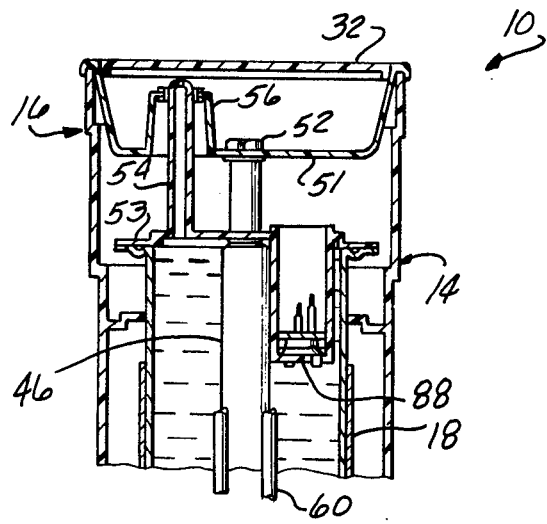
FIG. 5 is an enlarged, fragmentary cross-sectional view taken along line 5—5 of FIG. 3.
Figure 6:
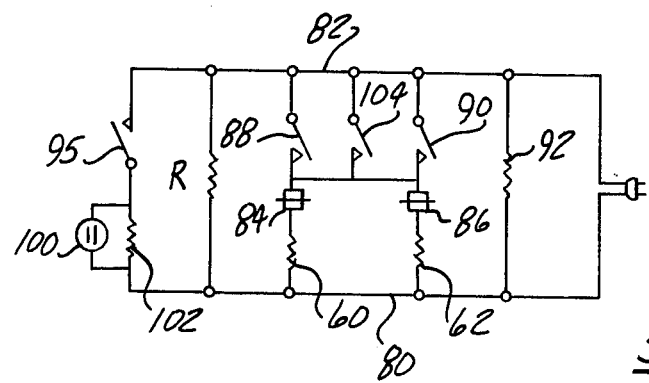
FIG. 6 illustrates a schematic diagram of one example of an electric circuit that may be employed in the coffee maker illustrated in FIG. 1.

In order to heat the two water tanks and the heat exchanger 58 to desired temperatures, a suitable electrical circuit is provided. As shown in FIG. 6, the electric tank heaters 60 and 62 are connected for energization between electric conductors 80 and 82 which are arranged to be connected to a conventional 115 volt, Hz. source. The connection to the conductors 80 and 82 are through limit circuit breakers 84 and 86, respectively, and two bi-metallic connectors or thermostats 88 and 90 that are shown in FIG. 5. The thermostats 88 and 90 are arranged to operate at a desired temperature; for example, they may be arranged to complete the energizing circuit for the electric tank heater 60 or 62 when the temperature in its associated water tank 18, 20 falls below a predetermined temperature, such as 180° F. The electric tank heaters 60 and 62 will continue to be energized until the temperature in their associated tank 18, 20 reaches another predetermined higher temperature, such as 250° F. As also shown in FIG. 6, an electronic heating element 92 associated with the warmer 12 is arranged to be connected between the primary conductors 80 and 82 and is made operable upon operation of the overall master switch 95 located on the front end of the upper housing 16. Obviously when the switch 95 is actuated, the warmer 12 is activated as well as the heating coils 60 and 62 (assuming their temperature is below the predetermined amount so as to close the thermostats 88 and 90). The front portion of the upper housing 16 further includes an indicator light 100 which is connected across an appropriate resistor 102 and is adapted to be energized when the switch 95 is in a closed position. A second switch 104 is adjacent the master switch 95 and, when it is desired to reheat a cup of previously brewed coffee, both switches 95 and 104 are turned on to activate the heaters 60 and 62 in the event the thermostats 88 and/or 90 are closed because of the temperature of the water in their associated tanks 18 or 20. After the previously brewed coffee has been heated through the heat exchanger 58 and retrieved by the user through the valve 64, switch 104 is then turned off.

It can thus be seen that the present invention has provided a new and improved coffee maker having three distinct uses, the first being the brewing of coffee in the conventional manner, the second being the providing of hot water for use as desired and the third-providing the reheating of previously brewed coffee utilizing the existing heating elements of the coffee maker.

It should be understood by those skilled in the art of coffee makers that other forms of the present invention may be had, all coming within the spirit of the invention and scope of the appended claims.

What is claimed is as follows:

1. A drip coffee maker for brewing a coffee beverage from roasted and ground coffee, said drip coffee maker comprising:
a drop brew basket filter means for receiving a bed of roasted and ground coffee;
means for providing a predetermined quantity of heated water for drip extraction from said roast and ground coffee, the improvement comprising:
a first liquid receiving means for receiving a predetermined quantity of water;
a first means for heating said predetermined quantity of water;
a first conduit communicating said heated water to said drip brew basket;
a second liquid receiving means for receiving a predetermined amount of coffee extract;
a first outlet;
second conduit means independent of said first conduit means for communicating said coffee extract to said first outlet via said first heating means so as to reheat said coffee extract as said coffee extract passes thereby;
a third liquid receiving means for receiving a predetermined quantity of water;
a second means for heating said predetermined quantity of water in said third liquid receiving means;
a second outlet;
a third conduit for communicating said heated water in said third liquid receiving means to said second outlet independent of said drip brew basket; and
said second means for communicating said coffee extract to said first outlet communicating same via both said first and second heating means for reheating said coffee extract.

2. The drip of coffee maker defined in claim 1 further comprising:
switch means for selectively energizing said first and second heating means for reheating said coffee extract.

3. A drip coffee maker for brewing a coffee beverage from roasted and ground coffee and for heating a cup of previously brewed coffee beverage, said drip coffee maker comprising:
a drip brew basket filter means for receiving a bed of roasted and ground coffee;
a first liquid receiving means for receiving a predetermined quantity of water;
a first heating element for heating said predetermined quantity of water, said heating element having a leg portion;
a first conduit communicating said heated water to said drip brew basket for providing a predetermined quantity of heated water for drip extraction from said roast and ground coffee;
a second liquid receiving means for receiving a cup of previously brewed coffee beverage;
a first outlet; and
second conduit means independent of said first conduit means for communicating said previously brewed coffee beverage to said first outlet, said second conduit means having a coiled section disposed about said leg portion of said first heating element so as to reheat said previously brewed coffee beverage as said coffee beverage flows from said second liquid receiving means to said second outlet.

4. The drip coffee maker defined in claim 3 further comprising:
a third liquid receiving means for receiving a predetermined quantity of water in said third liquid receiving means;
a second heating element for heating said predetermined quantity of water in said third liquid receiving means, said second heating element having a leg portion;
a second outlet;
a third conduit for communicating said heated water from said third liquid receiving means to said second outlet independent of said drip brew basket; and
said coiled section of said second conduit means being disposed about both leg portions of said first and second heating elements.

5. The drip coffee maker defined in claim 4 further comprising:
switch means for selectively energizing said first and second heating elements for reheating said previously brewed coffee beverage.

* * * * *